United States Patent [19]

Gozdz et al.

[11] Patent Number: 5,587,253
[45] Date of Patent: Dec. 24, 1996

[54] LOW RESISTANCE RECHARGEABLE LITHIUM-ION BATTERY

[75] Inventors: Antoni S. Gozdz, Tinton Falls; Caroline N. Schmutz, Eatontown; Paul C. Warren, Far Hills, all of N.J.

[73] Assignee: Bell Communications Research, Inc., Morristown, N.J.

[21] Appl. No.: 510,835

[22] Filed: Aug. 3, 1995

Related U.S. Application Data

[63] Continuation-in-part of Ser. No. 160,018, Nov. 30, 1993, Pat. No. 5,460,904, which is a continuation-in-part of Ser. No. 110,262, Aug. 25, 1993, Pat. No. 5,418,091, which is a continuation-in-part of Ser. No. 26,904, Mar. 5, 1993, Pat. No. 5,296,318.

[51] Int. Cl.$^6$ .......................... H01M 4/64; H01M 10/36
[52] U.S. Cl. .......................... 429/192; 429/217; 429/245
[58] Field of Search .................................... 429/245, 217, 429/192

[56] References Cited

U.S. PATENT DOCUMENTS

| | | | |
|---|---|---|---|
| 4,818,647 | 4/1989 | Plichta et al. | 429/218 |
| 4,939,050 | 7/1990 | Toyosawa et al. | 429/245 X |
| 5,004,657 | 4/1991 | Yoneda et al. | 429/217 X |
| 5,296,318 | 3/1994 | Gozdz et al. | 429/192 |
| 5,418,091 | 5/1995 | Gozdz et al. | 429/252 |

*Primary Examiner*—John S. Maples
*Attorney, Agent, or Firm*—Lionel N. White

[57] ABSTRACT

A perforate current collector element (21) embedded within at least one of its polymeric intercalation electrodes (23) reduces the internal resistance of a flexible rechargeable lithium-ion battery (20).

12 Claims, 9 Drawing Sheets

LOW RESISTANCE RECHARGEABLE LITHIUM-ION BATTERY

RELATED APPLICATIONS

This application is a continuation-in-part of U.S. patent application Ser. No. 08/160,018, filed 30 November 1993, now U.S. Pat. No. 5,460,904, issued 24 October 1995, which was a continuation-in-part of U.S. patent application Ser. No. 08/110,262, filed 23 August 1993, now U.S. Pat. No. 5,418,091, issued 23 May 1995, which in turn was itself a continuation-in-part of U.S. patent application Ser. No. 08/026,904, filed 5 March 1993, now U.S. Pat. No. 5,296,318, issued 22 March 1994. The prior applications, which are assigned to the assignee of this application, are incorporated herein by reference in their entirety.

BACKGROUND OF THE INVENTION

The present invention relates to electrolytic cells comprising polymeric film composition electrodes and separator membranes and to a manner of using such cells to provide highly efficient and economical batteries. In particular, the invention relates to unitary rechargeable lithium battery cells comprising an intermediate separator element containing an electrolyte solution through which lithium ions from a source electrode material move between cell electrodes during the charge/discharge cycles of the cell.

The invention is particularly useful for making such cells in which the ion source electrode is a material, such as a transition metal oxide, capable of intercalating lithium ions, and where an electrode separator membrane comprises a polymeric matrix made ionically conductive by the incorporation of an organic solution of a dissociable lithium salt which provides ionic mobility. More specifically, the present invention relates to a construction and arrangement of such battery cell elements which significantly reduces the internal resistance of the resulting battery while improving substantially the level of power capacity available in such a battery.

Prior rechargeable lithium ion battery cells, such as described in the incorporated disclosures, have generally been constructed by means of the lamination of electrode and separator/electrolyte cell elements which are individually prepared, by coating, extrusion, or otherwise, from compositions comprising polymeric materials, e.g., a plasticized polyvinylidene fluoride (PVdF) copolymer. For example, in the construction of a lithium-ion battery, a current collector layer of aluminum foil or grid was overlaid with a positive electrode film or membrane separately prepared as a coated layer of a dispersion of intercalation electrode composition, e.g., a $LiMn_2O_4$ powder in a copolymer matrix solution, which was dried to form the membrane. A separator/electrolyte membrane formed as a dried coating of a composition comprising a solution of the copolymer and a compatible plasticizer was then overlaid upon the positive electrode film. A negative electrode membrane formed as a dried coating of a powdered carbon dispersion in a copolymer matrix solution was similarly overlaid upon the separator membrane layer, and a copper collector foil or grid was laid upon the negative electrode layer to complete a cell assembly. This assembly was then heated under pressure to effect heat-fused bonding between the plasticized copolymer matrix components and to the collector grids to thereby achieve lamination of the cell elements into a unitary flexible battery cell structure.

The resulting laminated battery structure, which comprised a significant measure of homogeneously distributed organic plasticizer, particularly in the separator membrane stratum, was devoid of hygroscopic electrolyte salt and, as a result, could be stored at ambient conditions, either before or after being shaped or further processed, without concern for electrolyte deterioration due to reaction with atmospheric moisture. When it was desired to activate a battery in the final stage of manufacture, the laminate cell structure was immersed in or otherwise contacted with an electrolyte salt solution which imbibed into the copolymer matrix to provide substantially the same ionic conductivity enhancement as achieved by a preformed hybrid separator/electrolyte film containing such an electrolyte salt solution.

In order to facilitate the absorption of electrolyte solution during activation, it is generally preferred that a substantial portion of the plasticizer be previously removed from the copolymer matrix. This may readily be accomplished at any time following the laminating operation by immersion of the cell laminate in a copolymer-inert, low-boiling solvent, such as diethyl ether or hexane, which selectively extracts the plasticizer without significantly affecting the copolymer matrix of the cell element strata. The extracting solvent may then simply be evaporated to yield a dry, inactive battery cell which will readily absorb an effective amount of electrolyte solution that essentially replaces the extracted plasticizer.

As with any electrolytic cell, a lithium-ion cell generally prepared in the foregoing manner exhibits a characteristic internal electrical resistance which is ordinarily a function of the various composition materials and the amounts, i.e., the mass or thickness, of each employed in the cell. We were particularly surprised, therefore, in discovering that the internal resistance and performance of such cells having elements of substantially similar composition and mass could be significantly varied by means of the physical structure of the cell and disposition of the component materials within the cell. Arrangement of the cell components in accordance with the present invention has enabled a notable reduction in the internal resistance of the battery cells without compromising specific capacity and stability.

SUMMARY OF THE INVENTION

Previous polymeric battery cells have typically been structured to have a separator/electrolyte element layer or membrane interposed between respective positive and negative electrode layers with that sub-assembly disposed between conductive electrical current collector element foils, much in the manner depicted in FIG. 1. As earlier described, in electrolyte-activatable cells at least one, preferably both, of the collector elements is reticulated, for example in the form of an expanded metal foil grid, to provide for ready access of extracting and electrolyte fluids to the polymeric matrices of the cell.

A cell structure according to the present invention, on the other hand, comprises in its simplest form a similar arrangement in which at least one of the positive or negative electrode layers encompasses its respective collector grid, as shown in FIG. 2. The significant decrease in internal resistance of the cell evident in this arrangement is believed to be due in large part to the shortened average distance through the electrode layer to the collector, thus providing for a more expeditious flow of electrons. Of particular note is the fact that the specific capacity of the cell does not decrease, despite the displacement of about half the divided electrode composition material outward of the current collector element.

As will be observed from later description, other embodiments of the invention, as depicted in the drawing, yield a substantial increase in cell capacity as compared with cells of previous construction having equivalent amounts of active electrode materials.

BRIEF DESCRIPTION OF THE DRAWING

The present invention will be described with reference to the accompanying drawing of which:

FIG. 8 is a graph of the comparative total capacities of laminated lithium-ion batteries of FIGS. 1, 2, and 4 as a function of charge/discharge cycle rate.

DESCRIPTION OF THE INVENTION

Figure 1:
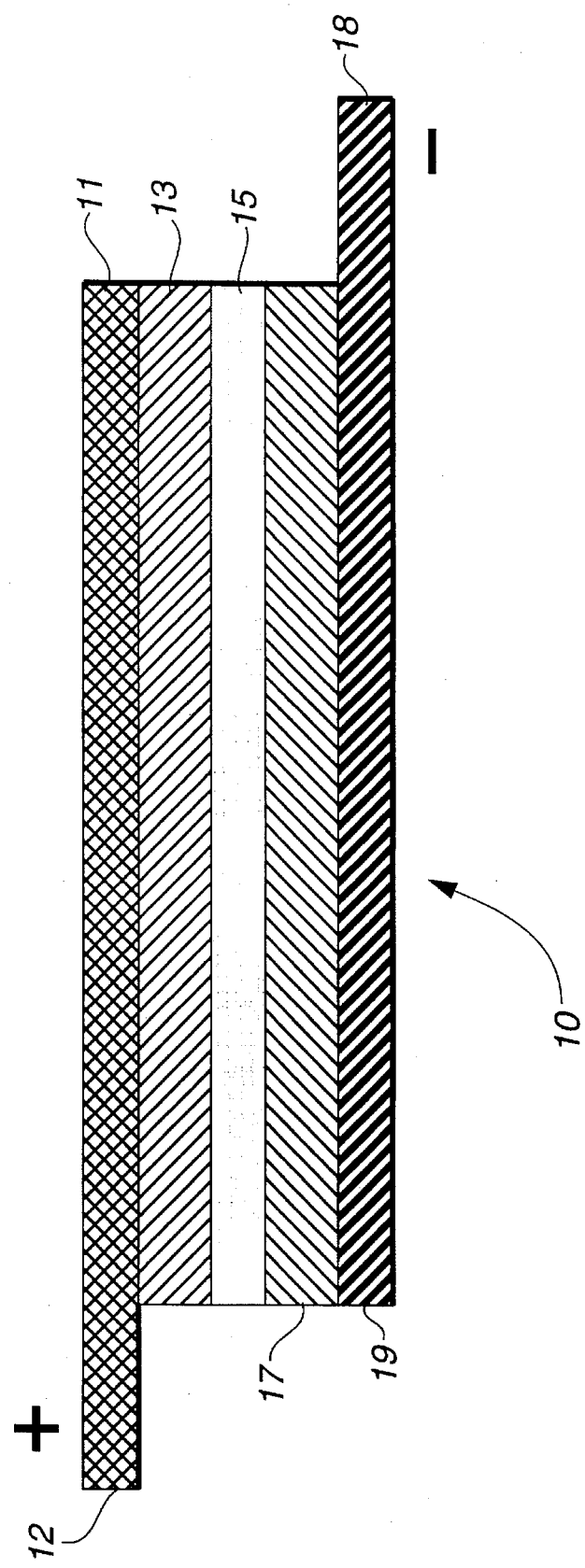
FIG. 1 is a diagrammatic representation of a typical laminated lithium-ion battery cell structure utilized prior to the present invention.

Useful lithium-ion cell batteries have been made economically available through the technological advances described in the above-referenced incorporated patent specifications. The basic structure of such a cell 10 is depicted in FIG. 1 and essentially comprises positive and negative electrode layer elements 13, 17 between which is interposed a separator/electrolyte element 15 comprising a polymeric matrix, preferably a polyvinylidene fluoride copolymer, in which a lithium salt electrolyte solution will ultimately be dispersed. These electrodes respectively comprise a lithiated intercalation compound, e.g., $Li_xMn_2O_4$, and a complementary material capable of reversibly intercalating lithium ions, e.g., carbon in the form of petroleum coke or graphite, each dispersed in a similar polymeric matrix. Electrically-conductive current collectors 11, 19, preferably of aluminum and copper, contact respective electrode elements 13, 17 and are bonded, such as by thermal lamination, with the remaining cell elements to form a unitary battery cell. In order to facilitate subsequent processing of the cell, e.g., to incorporate the lithium salt electrolyte, at least one of the collector elements is permeable to fluids, such as in the form of a perforate expanded metal grid 12. To provide simple battery terminal contacts, the current collector elements may be extended as tabs 12, 18.

Figure 2:
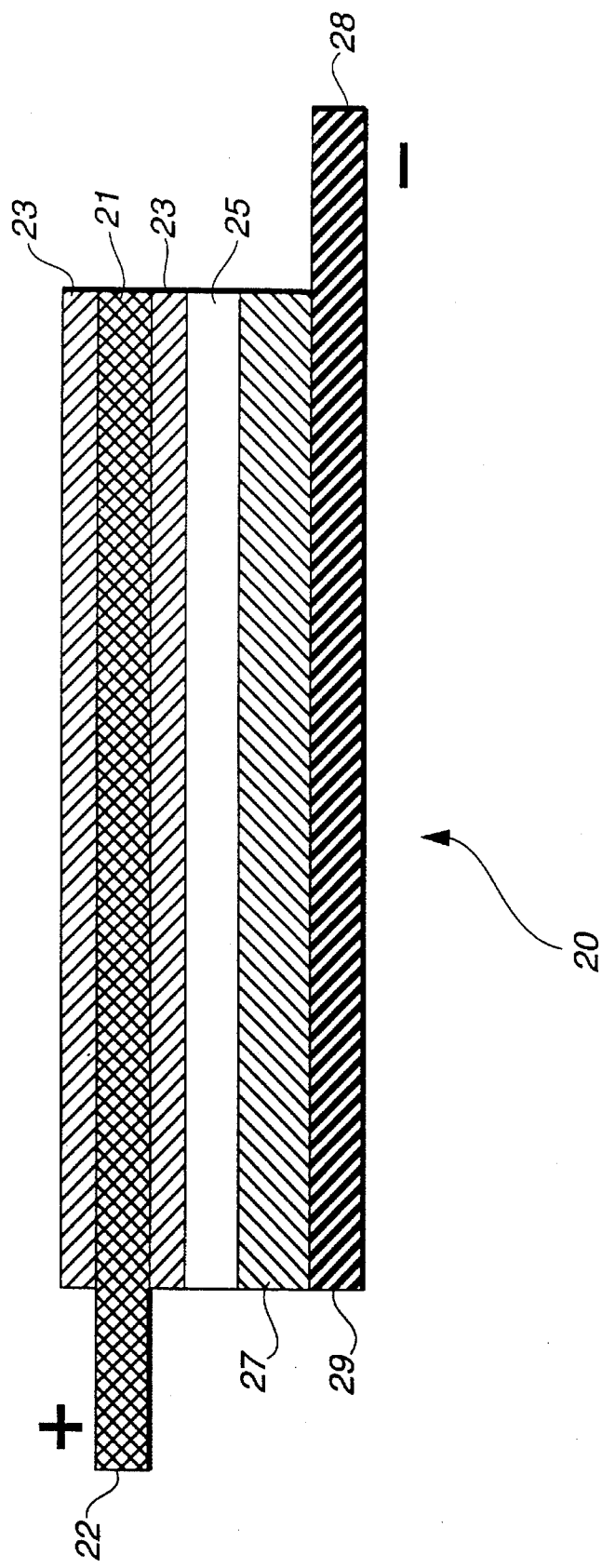
FIG. 2 is a diagrammatic representation of a typical laminated lithium-ion battery cell structure of the present invention.
Figure 3:
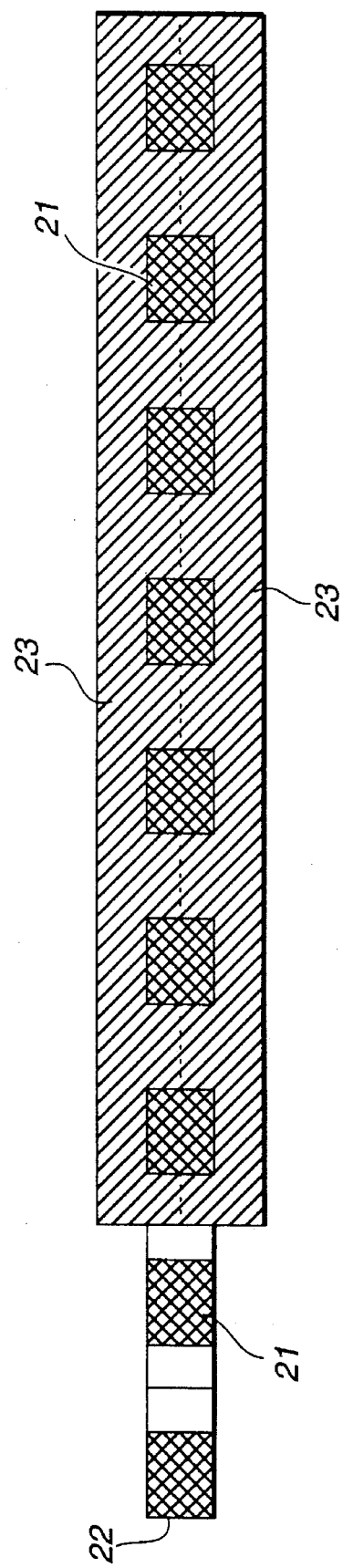
FIG. 3 is a diagrammatic representation of a longitudinal cross-sectional elevation view of an electrode/collector element of the present invention.

By comparison, the substance of the present invention may readily be seen in FIG. 2 where the positive electrode composition layer is divided into two elements 23, 23 which are disposed at the respective surfaces of current collector grid 21. The resulting composite electrode/collector element is then laminated with separator element 25, negative electrode layer 27, and negative collector foil 29 to form unitary battery cell 20 in substantially the same manner as that used for preparing earlier cell 10. The structure of the composite electrode/collector may be seen in greater detail in FIG. 3 which generally depicts the result of the preferred thermal lamination of electrode composition layers, or membranes, 23, 23 with interposed collector grid 21. Although grid 21 is shown to be centrally located within the laminate electrode layer, it should be understood that by preferential selection of composite membranes 23 of differing thicknesses the collector may be positioned at any depth within the electrode composition, as desired. Also, the invention allows for the use of electrode membranes 23 of differing composition, e.g., varying proportions of active intercalation component, to achieve a composite electrode of graded power capacity, for instance.

Of particular note in this laminated incorporation of the collector is the manner in which the polymeric electrode composition of membranes 23 penetrates the perforate grid to form a single coherent electrode layer within which collector grid 21 is essentially embedded. In addition to thus establishing ionic conductivity throughout the electrode composition, this lamination ensures intimate electronic contact between the electrode and collector elements and, further, advantageously provides firm polymer matrix bonding and physical reinforcement for the relatively fragile reticulate collector element. Such added integrity is particularly useful when fashioning compact multilayer batteries of high capacity by repeated or concentric folding of an elongate flexible cell.

Figure 4:
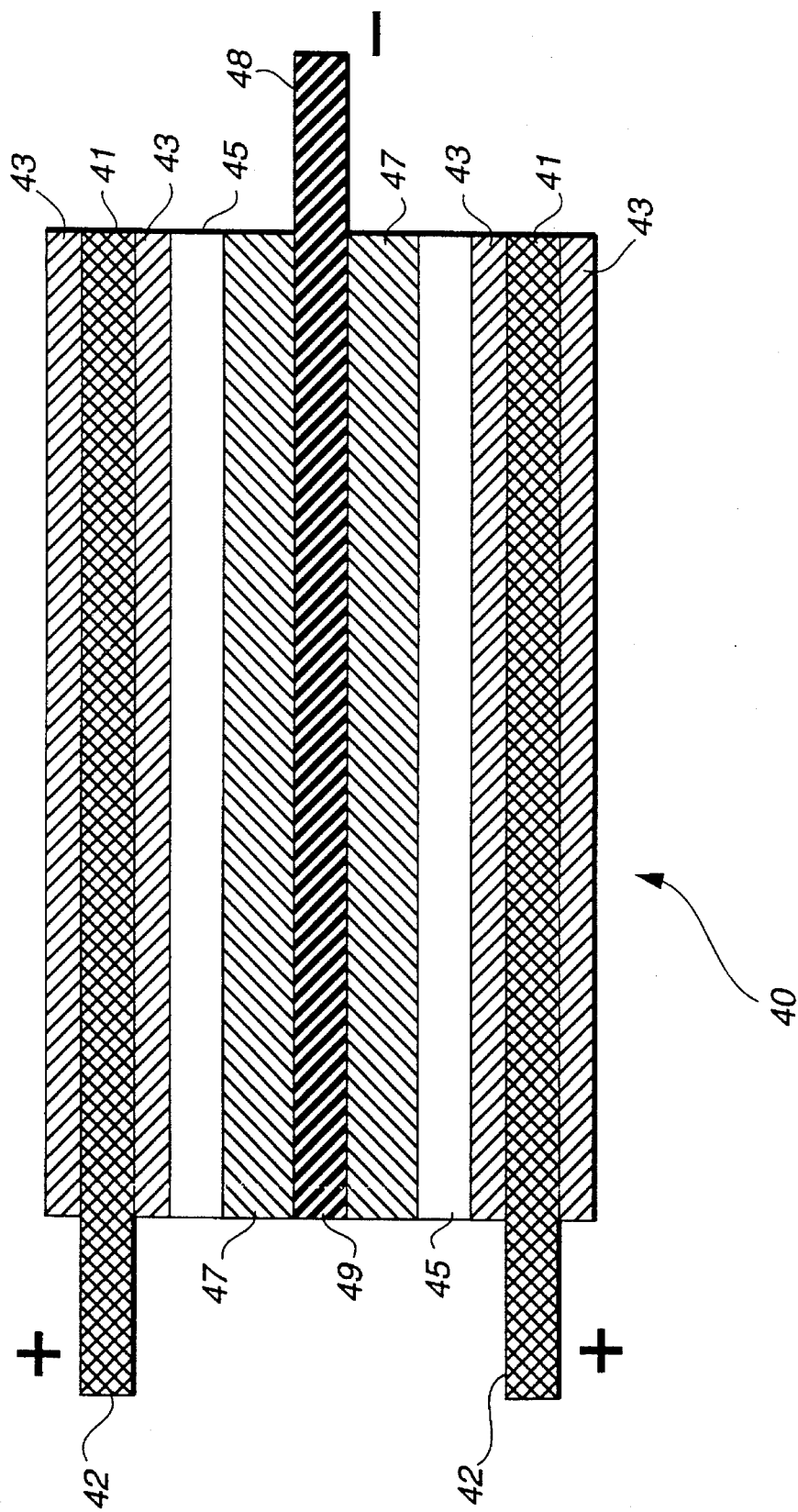
FIG. 4 is a diagrammatic representation of a multicell battery structure of the present invention.

A further useful embodiment of the invention which provides a battery 40 having a significant increase in specific capacity is depicted in FIG. 4. This arrangement essentially incorporates a duplicate pair of cells structured as shown in FIG. 2, with a common foil or grid current collector element 49 serving both cell members. In assembling this battery, laminated electrode/collectors 41, 43 may be in turn laminated with separator membranes 45, electrodes 47, and collector 49, or, preferably, a laminated sub-assembly of collector 49 and electrodes 47 may be prepared to then be laminated with separator membranes 45 and a pair of sub-assembly electrode/collectors 41, 43. In this preferred procedure, use of a grid for negative element 49 results in an embedded-collector electrode of the type shown in FIG. 3, and provides the final battery with additional benefit from the invention. As shown in FIG. 4, the duplicated electrode/collector is preferably that of positive polarity, since collector 41 employed with the composition of positive electrode 43 is normally of lower density aluminum, while negative collector 49 is of more dense copper. Thus, although the disposition of electrodes of a particular polarity is not critical to operation of the battery, a significant weight advantage and commensurate capacity improvement are realized in the depicted arrangement.

A number of electrolytic cell laminates with similar compositions, yet varying in structure according to the foregoing description, were prepared and tested for electrolytic and physical suitability for use in rechargeable batteries cells. The following examples are illustrative of such preparation and use.

EXAMPLE 1

A separator/electrolyte membrane coating solution was prepared by suspending 6 g of an 88:12 vinylidene fluoride (VdF):hexafluoropropylene (HFP) copolymer of about 380× $10^3$ MW (Kynar FLEX 2801, Atochem) and 4 g of silanized fumed silica in about 40 g of acetone and adding to this mixture about 10 g of dibutyl phthalate (DBP). The completed mixture was warmed to about 50° C. to facilitate dissolution of the copolymer and was homogenized in a laboratory ball mill for about 6 hr. A portion of the resulting slurry was coated on a glass plate with a doctor blade device gapped at about 0.5 mm. The coated film was allowed to dry within the coating enclosure under moderately flowing dry air at room temperature for about 10 min to yield a tough, flexible film which was stripped from the glass plate. The film was about 0.1 mm thick and was easily cut into rectangular separator elements which could be stored for days at ambient room conditions without significant weight loss.

EXAMPLE 2

A positive electrode composition was prepared by homogenizing in a lid-covered stainless steel blender for about 10 min at 4000 rpm a mixture of 44 g of $Li_{1+x}Mn_2O_4$, where $0<x\leq 1$ (e.g., $Li_{1.05}Mn_2O_4$ prepared in a manner described in U.S. Pat. No. 5,266,299), sieved through 53 μm, 11.8 g of the VdF:HFP copolymer (FLEX 2801) of example 1, 18 g dibutyl phthalate, 4.7 g conductive carbon (Super-P Black, MMM Carbon, Belgium), and about 75 g acetone. The resulting slurry was degassed by briefly applying a reduced pressure to the mixing vessel, and a portion was then coated on a glass plate with a doctor blade device gapped at about 0.8 mm. The coated layer was allowed to dry within the coating enclosure under moderately flowing dry air at room temperature for about 10 min to yield a tough, flexible film which was stripped from the glass plate. The film was about 0.25 mm thick and was easily cut into rectangular electrode elements which could be stored for days at ambient room conditions without significant weight loss.

EXAMPLE 3

A negative electrode composition was prepared by homogenizing in a lid-covered stainless steel blender for about 10 min at 4000 rpm a mixture of 21 g of a commercial petroleum coke (MCMB 25-10, Osaka Gas), ball-milled and sieved through 53 μm, 6.0 g of the VdF:HFP copolymer (FLEX 2801) of example 1, 9.4 g dibutyl phthalate, 1.12 g Super-P conductive carbon, and about 36 g acetone. The resulting slurry was also degassed by briefly applying a reduced pressure to the mixing vessel, and a portion was then coated on a glass plate with a doctor blade device gapped at about 0.5 mm. The coated layer was allowed to dry within the coating enclosure under moderately flowing dry air at room temperature for about 10 min to yield a tough, flexible film which was readily stripped from the glass plate. The film was about 0.15 mm thick and was easily cut into rectangular electrode elements which could be stored for days at ambient room conditions without significant weight loss.

Similarly suitable electrode and separator compositions were obtained with vinylidene fluoride copolymers of 8–25% hexafluoropropylene, such copolymers acquired from other commercial sources (e.g., Solef 21-series, Solvay), and vinylidene fluoride copolymers with like proportions of chloro-trifluoroethylene (Solef 31-series, Solvay). Such copolymer matrix compositions functioned well with homogeneously incorporated compatible plasticizers in the range of about 20–70%. Further, $Li_xCoO_2$ and $Li_xNiO_2$ intercalation compounds were effective substitutes for $Li_xMn_2O_4$ as the active component of positive electrode compositions.

Figure 5:
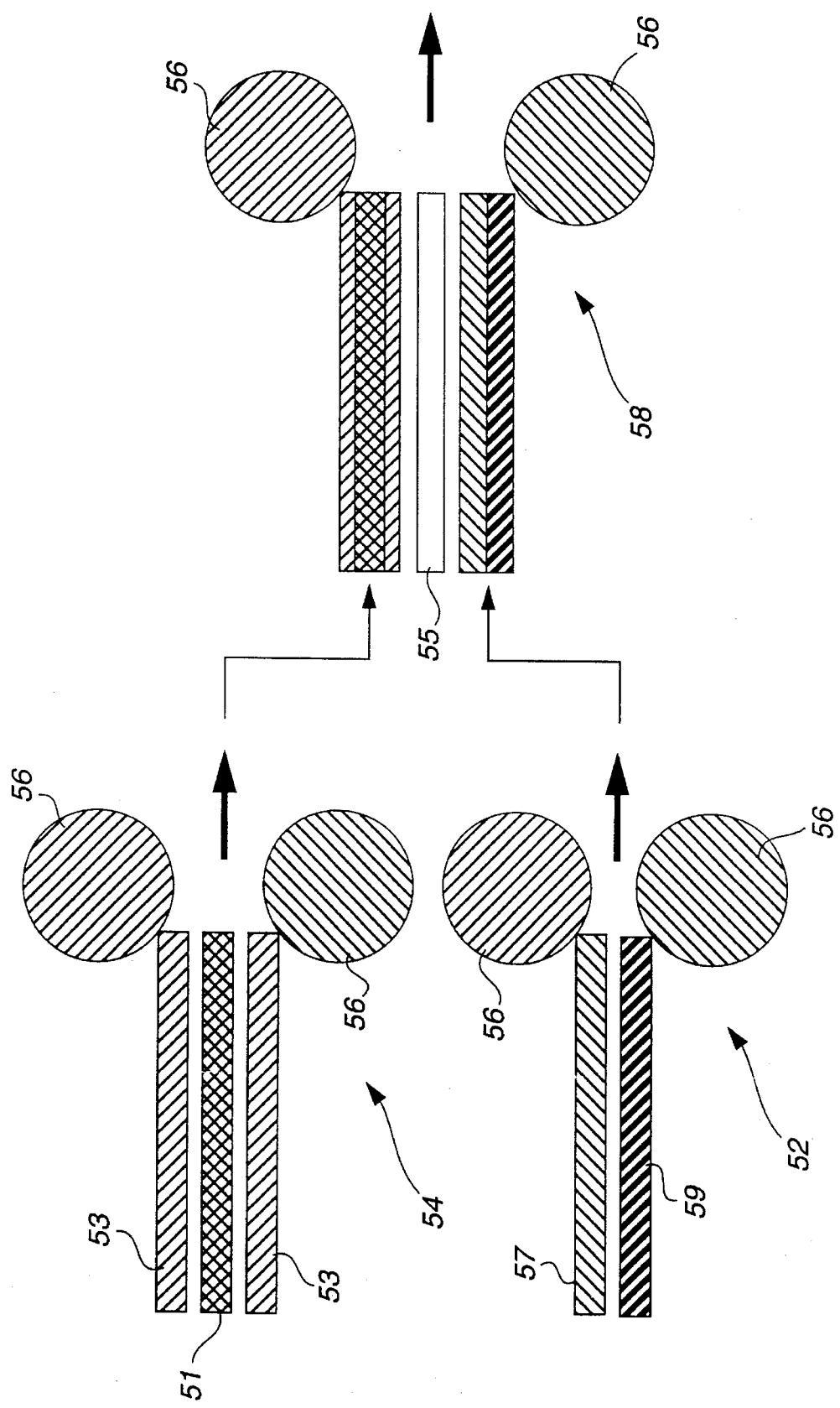
FIG. 5 is a diagrammatic representation of a laminating process for preparing a battery cell structure of the present invention.

Rechargeable battery structures may be readily assembled from component electrode and separator elements prepared in the manner of the foregoing examples. The conditions of electrode preparation may be varied, either in coating composition consistency or coated layer thickness, to obtain a basis weight ratio of active intercalation material in the positive:negative electrode combination between about 2.1 and 3.5, preferably about 2.2 when using petroleum coke or about 3.0 with graphite. Similarly, various assembly lamination procedures may be employed utilizing, e.g., heated flat-bed presses or, preferably, continuous process heated-roller assembly lines, such as generally depicted in FIG. 5 with a cell of the type shown in FIG. 2. There, a negative electrode/collector laminate 57, 59 is formed at station 52 between heated rollers 56 at about 150° C. and about $4\times 10^4$ Pa pressure, a positive electrode/collector laminate 51, 53 is likewise formed at station 54, and the sub-assembly pair are then laminated with separator membrane 55 at station 58. Additional such laminating stations may be included to accommodate the described fabrication of expanded batteries of the type depicted in FIG. 4.

EXAMPLE 4

A battery cell 10 of the basic prior structure depicted in FIG. 1 was prepared in the following manner. An 80×40 mm copper current collector foil 19, preferably in the form of an open mesh grid of about 30 μm thickness (e.g., MicroGrid precision expanded foil, Delker Corp.), was trimmed at one end to form a tab 18 which would subsequently serve as a convenient battery terminal. To enhance the ensuing adherence to its associated electrode element, grid 19 was surface-cleaned by immersing for a few seconds in a common "copper bright" solution (mixed dilute $HNO_3$, $H_2SO_4$), rinsing in water, air drying, dip coating in a 0.5% acetone solution of the VdF:HFP copolymer of Example 1, air drying, and oven heating at about 350° C. for 5–10 seconds.

A 60×40 mm carbon negative electrode element 17, cut from the film prepared in Example 3, was overlaid upon grid 19 and the element pair was placed between buffer sheets of adherent polyethylene terephthalate (not shown). The assembly was then passed through a laminating station, as at 52 in FIG. 5, consisting essentially of a commercial card-sealing laminator.

Similarly-sized positive electrode element 13, as prepared in Example 2, and acetone-cleaned aluminum current collector grid 11 were laminated in like manner, as at 54 (FIG. 5), and the resulting electrode/collector pair were laminated with an interposed separator membrane 55, as at 58 (FIG. 5).

The laminated battery structure was extracted of a substantial amount of the DBP plasticizer comprising the polymer matrices of the laminated layers, particularly the separator/electrolyte, by immersion for about 10 minutes in stirred diethyl ether. The extracted battery structure was then activated in preparation for charge/discharge cycle testing by immersion, under a substantially moisture-free atmosphere, in a 1M electrolyte solution of $LiPF_6$ in 50:50 ethylene carbonate (EC):dimethyl carbonate (DMC) for about 20 min during which the battery imbibed an amount of solution which substantially replaced the extracted plasticizer. The activated battery was then hermetically sealed, but for extending terminal tabs 12, 18, in a close-fitting envelope of moisture-proof barrier material, such as polyolefin/aluminum foil/polyester laminate sheeting commercially used for foodstuff enclosures.

EXAMPLE 5

A battery cell 20 having the structure of the present invention, as depicted in FIG. 2, was prepared in the following manner. A portion of the positive electrode composition of Example 2 was similarly coated and processed to a dried film thickness of about 0.12 mm. Two 60×40 mm sections were cut from the film to form positive electrode elements 53, 53 (FIG. 5) which were then assembled with an aluminum collector grid 51 and laminated with the remaining negative electrode, collector, and separator elements of Example 4 in the manner depicted in FIG. 5. The resulting cell was further processed with extraction and electrolyte activation as described in Example 4 to provide a test battery.

EXAMPLE 6

An expanded battery 40 of the present invention, as depicted in FIG. 4, was prepared with additional positive electrode film sections 43 from Example 5 following the laminated fabrication procedure earlier described in which each of the three electrode/collector sub-assemblies was prelaminated, as at station 54 of FIG. 5, prior to final lamination with separators 45, as at station 58. Extraction, electrolyte activation, and packaging as described in the foregoing examples completed fabrication of the test battery.

EXAMPLE 7

Figure 6:
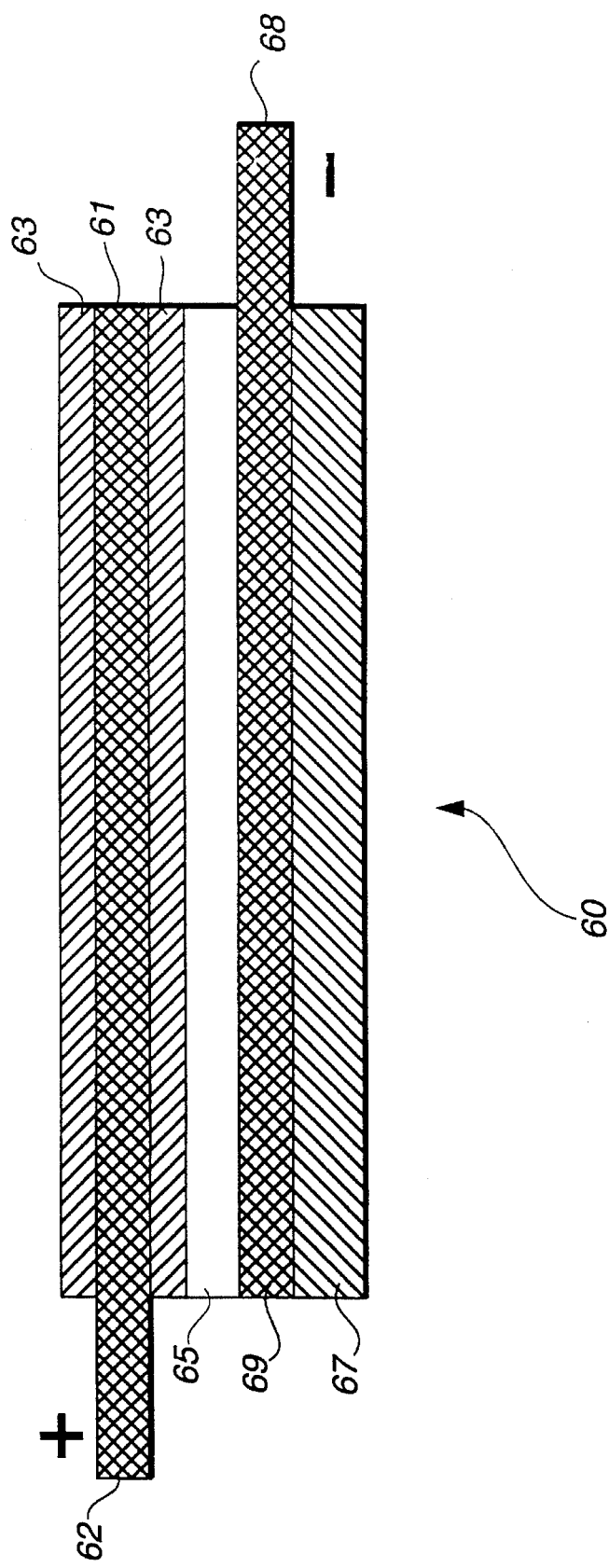
FIG. 6 is a diagrammatic representation of a variant laminated lithium-ion battery cell structure of the present invention.

A highly versatile variant of the present invention as shown in FIG. 2 is depicted in FIG. 6 and comprises grid current collectors 61, 69 which are both interposed between elements of the laminate cell 60. In addition to the embedding of collector 61 within positive electrode 63, collector 69 is laminated within negative electrode 67 substantially at its interface with separator element 65, or at such similar location which will provide an optimum balance of inter-collector and average intra-electrode distances.

This configuration of cell elements, in addition to reducing inter-collector spacing, also provides each collector grid element with integral polymer reinforcement, both of which conditions are advantageous in fabricating structures in which an elongate cell is acutely folded on transverse axes to form a concentric manifold compact laminate battery having high specific capacity. Pre-lamination of the collector elements with respective electrode composition layers in the manner previously described is likewise preferred, since this operation serves to ensure thorough incorporation of the collectors into the ultimate laminate structure without grid surface pretreatment.

Figure 7:
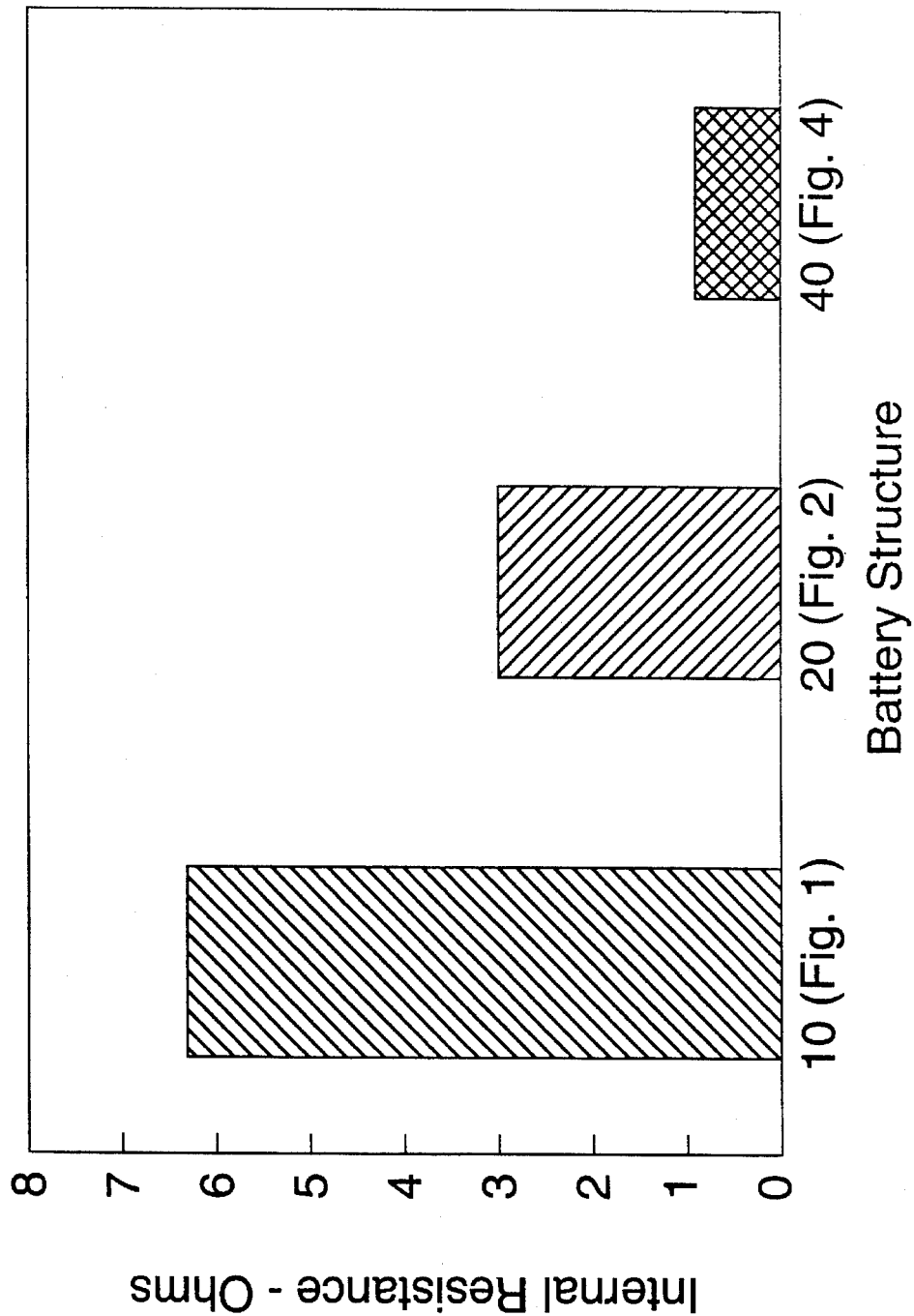
FIG. 7 is a chart of the comparative internal resistances of laminated lithium-ion batteries of FIGS. 1, 2, and 4.
Figure 8:
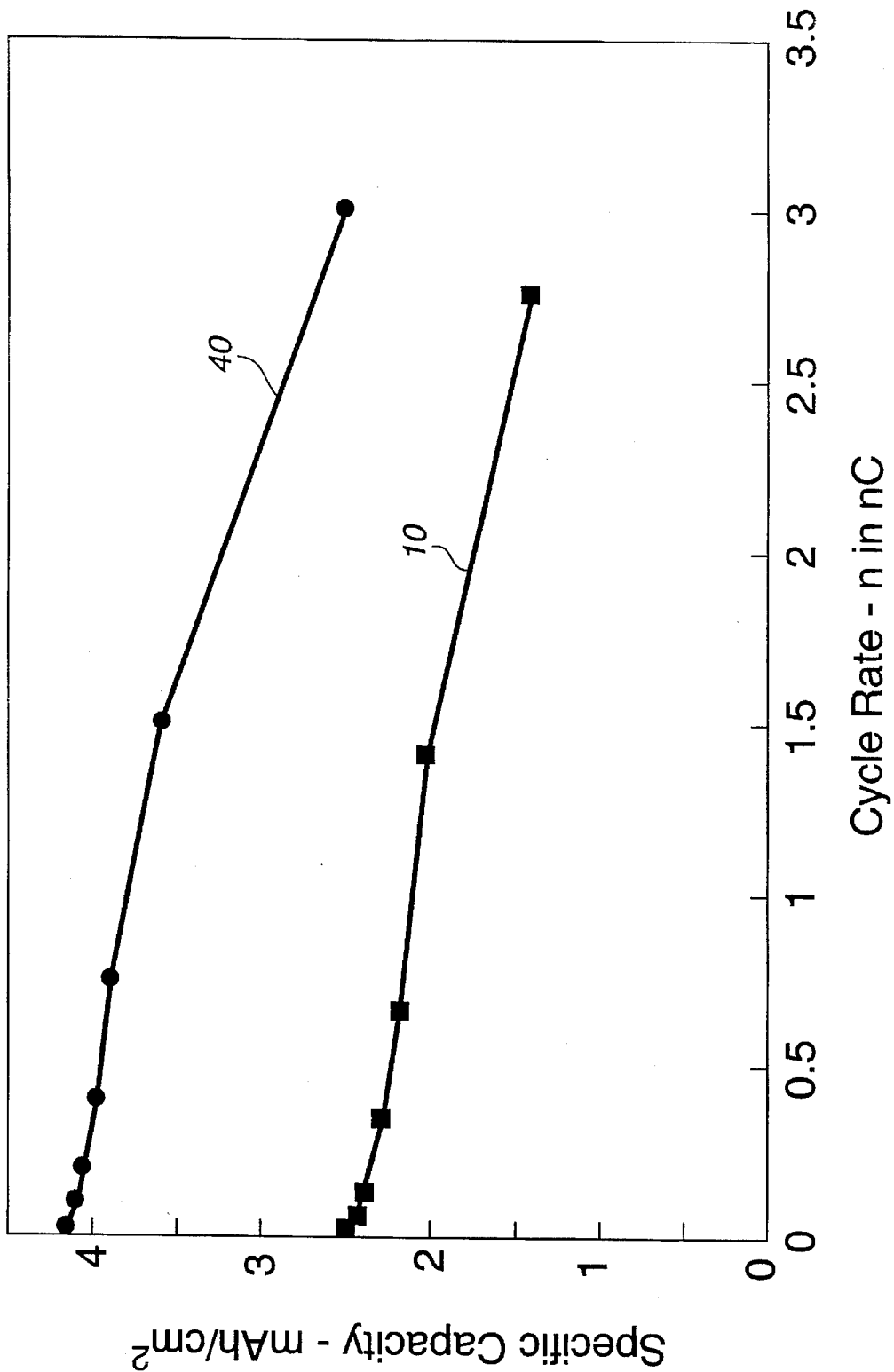
FIG. 8 is a graph of the comparative specific capacities of laminated lithium-ion batteries of FIGS. 1 and 4 as a function of charge/discharge cycle rate.
Figure 9:
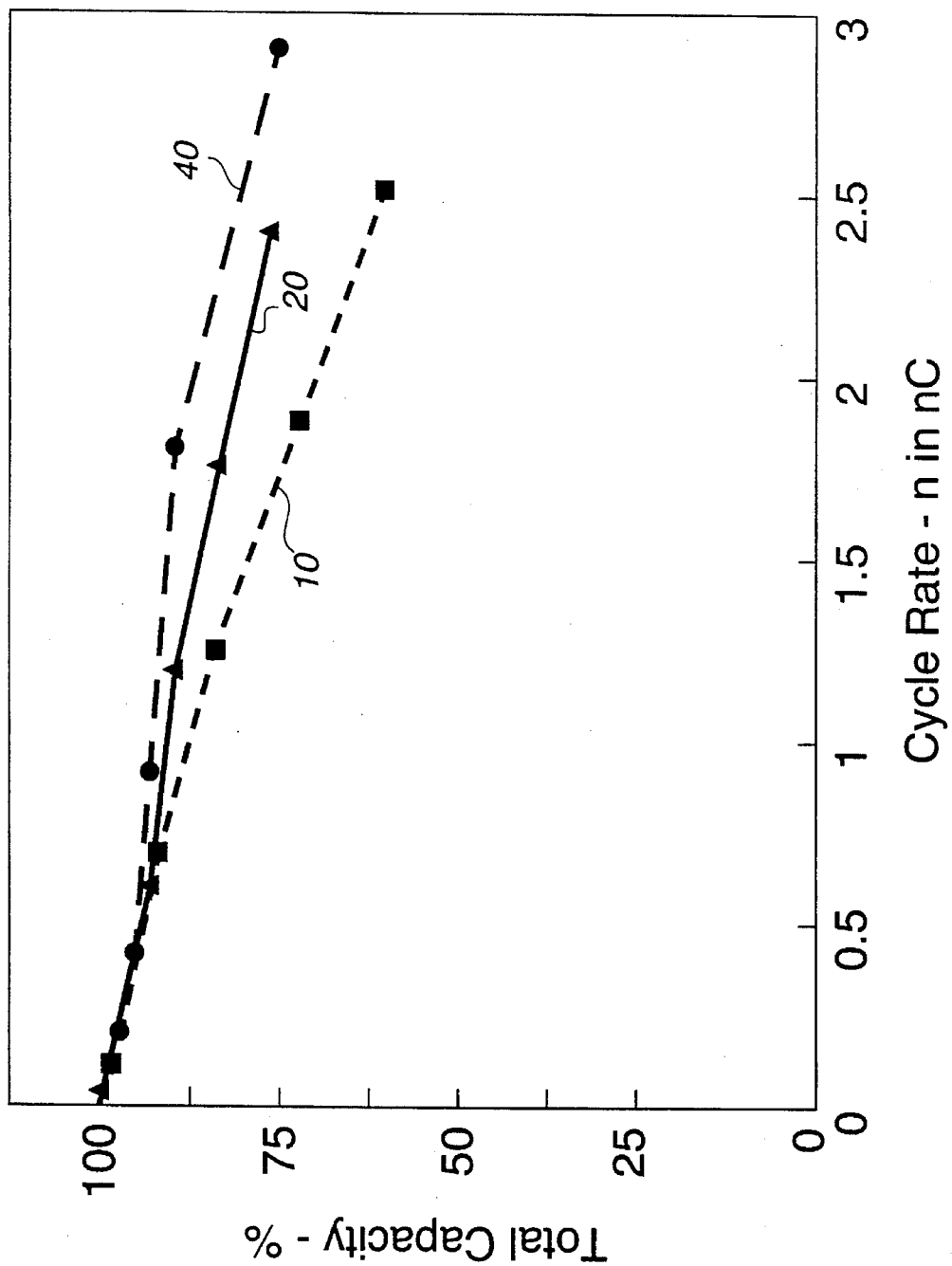

The batteries prepared from cells 10, 20, and 40 were tested comparatively in charge/discharge cycling at various rates (a 2C rate designates a two hour charge or discharge cycle segment) over the range of about 4.5 V to 2.0 V. During the early stage of such testing, the internal resistance of each battery was measured by the common voltage-drop method, and was determined to be 6.3 Ω, 3.0 Ω, and 0.95 Ω, respectively, as shown in FIG. 7. The dramatic improvement in this property apparently arises from the embedded collector structure of the present invention; however, the unusually high specific capacity exhibited by these cells is particularly surprising, considering the physical disposition of a considerable proportion of active electrode material beyond the encompassing current collectors. The persistence of improved specific capacity of the new battery structure over increasing cycle rates, as shown in FIG. 8, and the improved stability of such capacity at such increasing rates, as evident in the comparative traces of FIG. 9, attest to the further advantageous effects of the present invention.

What is claimed is:

1. A rechargeable lithium-ion battery structure comprising positive and negative electrode layer elements having a separator element disposed therebetween and current collectors associated therewith, each of said elements comprising a flexible, polymeric matrix film composition and being bonded to contiguous elements at its respective interfaces to form a unitary flexible structure characterized in that a) said positive electrode layer element comprises a composition of a lithium ion intercalating compound selected from the group consisting of $Li_xMn_2O_4$, $Li_xCoO_2$, and $Li_xNiO_2$; and b) at least one of said current collectors is embedded within its associated electrode layer.

2. A battery structure according to claim 1 wherein said embedded collector is substantially coextensive with its associated electrode and is perforate, whereby the composition of said electrode penetrates said collector to maintain ionic conductivity through said electrode layer.

3. A battery structure according to claim 2 wherein said embedded collector is disposed substantially equidistant from the surfaces of said electrode layer, thereby minimizing the internal resistance of said structure.

4. A battery structure according to claim 1 wherein at least one of said current collectors is embedded within said electrode layer at a location contiguous to an electrode/separator interface.

5. A battery structure according to claim 4 wherein said electrode layer comprises a composition of a lithium intercalating material consisting essentially of carbon.

6. A battery structure according to claim 2 wherein each of a plurality of said collectors is embedded within its respective associated electrode.

7. A battery structure according to claim 6 wherein the plurality of electrodes comprises a like polarity pair disposed symmetrically about an electrode of opposite polarity.

8. A rechargeable lithium-ion battery structure comprising:

a) a plurality of positive electrode elements made of a flexible polymer composition containing a lithiated intercalation compound;

b) a negative electrode element made of a flexible polymeric matrix composition containing carbon as a material capable of lithium intercalation, wherein said negative electrode element is positioned between each of said positive electrodes;

c) a plurality of separator elements composed of a flexible polymeric film composition capable of being made ionically conductive by incorporation of an organic solution of a dissociable lithium salt which can provide ionic mobility, at least one of said separator elements being disposed on either side of said negative electrode, thereby separating the negative electrode from the positive electrodes;

d) a plurality of current collectors, wherein a current collector is embedded within each of said positive electrodes and said negative electrode; and e) wherein each of said elements is bonded to contiguous elements to form a unitary flexible structure.

9. A battery structure according to claim 8 wherein said current collectors are made of aluminum or copper.

10. A battery structure according to claim 9 wherein said current collectors are perforate.

11. A battery structure according to claim 10 wherein said current collectors are made of a metal foil grid.

12. A battery structure according to claim 8 wherein the flexible polymeric matrix film composition is a plasticized polyvinylidene fluoride copolymer.

* * * * *

UNITED STATES PATENT AND TRADEMARK OFFICE
CERTIFICATE OF CORRECTION

PATENT NO. : 5,587,253
DATED     : 24 December 1996
INVENTOR(S): Antoni S. Gozdz et al.

It is certified that error appears in the above-identified patent and that said Letters Patent is hereby corrected as shown below:

On the title page, item [75], inventor's should read --

Antoni S. Gozdz, Tinton Falls;

Caroline N. Schmutz, Eatontown;

Jean-Marie Tarascon, Martinsville;

Paul C. Warren, Far Hills, all of N.J.

--.

Signed and Sealed this

Twenty-fifth Day of March, 1997

*Attest:*

BRUCE LEHMAN

*Attesting Officer*       *Commissioner of Patents and Trademarks*